US007779306B1

(12) United States Patent
Philbin et al.

(10) Patent No.: US 7,779,306 B1
(45) Date of Patent: Aug. 17, 2010

(54) METHOD FOR AUTOMATICALLY DIAGNOSING HARDWARE FAULTS IN A DATA STORAGE SYSTEM

(75) Inventors: Brion Philbin, South Grafton, MA (US); Michael Manning, Hopkinton, MA (US); Ashok Tamilarasan, Framingham, MA (US); Ying Guo, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 587 days.

(21) Appl. No.: 11/690,147

(22) Filed: Mar. 23, 2007

(51) Int. Cl.
G06F 11/00 (2006.01)
(52) U.S. Cl. .............. 714/43; 714/4; 370/216
(58) Field of Classification Search .................. 714/4, 714/43; 370/216
See application file for complete search history.

(56) References Cited

U.S. PATENT DOCUMENTS

| 6,430,714 B1* | 8/2002 | McAdam et al. ............ 714/704 |
| 6,954,882 B2* | 10/2005 | Beer et al. .................... 714/43 |
| 7,194,673 B2* | 3/2007 | Tuttle et al. ................. 714/775 |
| 7,571,356 B2* | 8/2009 | Inoue et al. ................... 714/42 |
| 2006/0048018 A1* | 3/2006 | Hosoya et al. ................ 714/48 |
| 2008/0225701 A1* | 9/2008 | Pimlott ....................... 370/221 |

* cited by examiner

Primary Examiner—Philip Guyton (57) ABSTRACT

A method for automatically diagnosing faults a data storage system. The system includes a plurality of enclosures each having: a primary port; an expansion port; a plurality of disk drives; and a link control card coupled to the primary port and to the expansion port and the plurality of disk drives. The link control card includes a cut through switch having: disk drive port error counters for counting at ports of the plurality of disk drives; a primary port error counter for counting cumulative errors at the primary port, and an expansion port error counter for counting cumulative errors at the expansion port. The primary ports and expansion ports are serially interconnected to the storage processor through a fiber channel loop. The method sequentially reads counters in each one of the enclosures to determine whether errors counted in any one of such counters exceeds a predetermined threshold over a predetermined period of time.

2 Claims, 8 Drawing Sheets

METHOD FOR AUTOMATICALLY DIAGNOSING HARDWARE FAULTS IN A DATA STORAGE SYSTEM

TECHNICAL FIELD

This invention relates generally to storage systems and more particularly to a method for automatically diagnosing faults in hardware components used in such systems

BACKGROUND

As is known in the art, a typical storage system includes one or more racks of storage devices or enclosures. A loop, such as a fibre channel loop, is a common topology in which the enclosures of a storage system are connected. Communication signals traverse the loop in one direction and pass from enclosure to enclosure in a daisy-chain fashion. Enclosures receiving communication signals targeted for another enclosure forward those signals along the loop.

Previously, the process to identify faulty backend loop cables and LCCs was manually driven. Technical support personnel would make a guess about a faulty component based on soft or hard failure errors along with trial replacements of hardware. This reactive process is time consuming, error prone, and occasionally expensive in the case where all hardware components are replaced.

SUMMARY

In accordance with the present invention, a method is provided for automatically diagnosing faults in hardware components used in a data storage system. The system includes a plurality of enclosures. Each one of the enclosures has: a primary port; an expansion port; a plurality of disk drives; and a link control card coupled to the primary port and to the expansion port and the plurality of disk drives. The link control card includes a cut through switch having: disk drive port error counters for counting cumulative errors at ports of the plurality of disk drives; a primary port error counter for counting cumulative errors at the primary port, and an expansion port error counter for counting cumulative errors at the expansion port. The primary ports and expansion ports are serially interconnected to the storage processor through a fibre channel loop. The method includes sequentially reading the disk drive port error counters, the primary port error counter and the expansion port error counter in each one of the enclosures to determine whether errors counted in any one of such counters exceeds a predetermined threshold over a predetermined period of time.

In one embodiment, the method includes processing the counters to isolate faults in either one of the expansion ports, one of the primary ports, one of the disk drive ports, or a cable of the fibre channel loop connecting a pair of the enclosures.

With such method, fault isolation is now proactive and much faster than the previous manually driven approach. The guesswork done by technical support has been eliminated and an immediate diagnosis based on data at the initial time of failure will lead to shorter customer down times and improved overall performance. This proactive monitoring and diagnosis technique improves the overall reliability of the product. In addition, there will be significant cost savings when perfectly good components are not replaced due to the guesswork previously involved with manual fault isolation.

This method automates the process of diagnosing a bad hardware component across enclosures, be that a link control card (LCC) or a cable. The automated process achieves more reliable and accurate results over the existing manually driven approach. The method uses this continuous stream of data to accurately identify the failing component.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
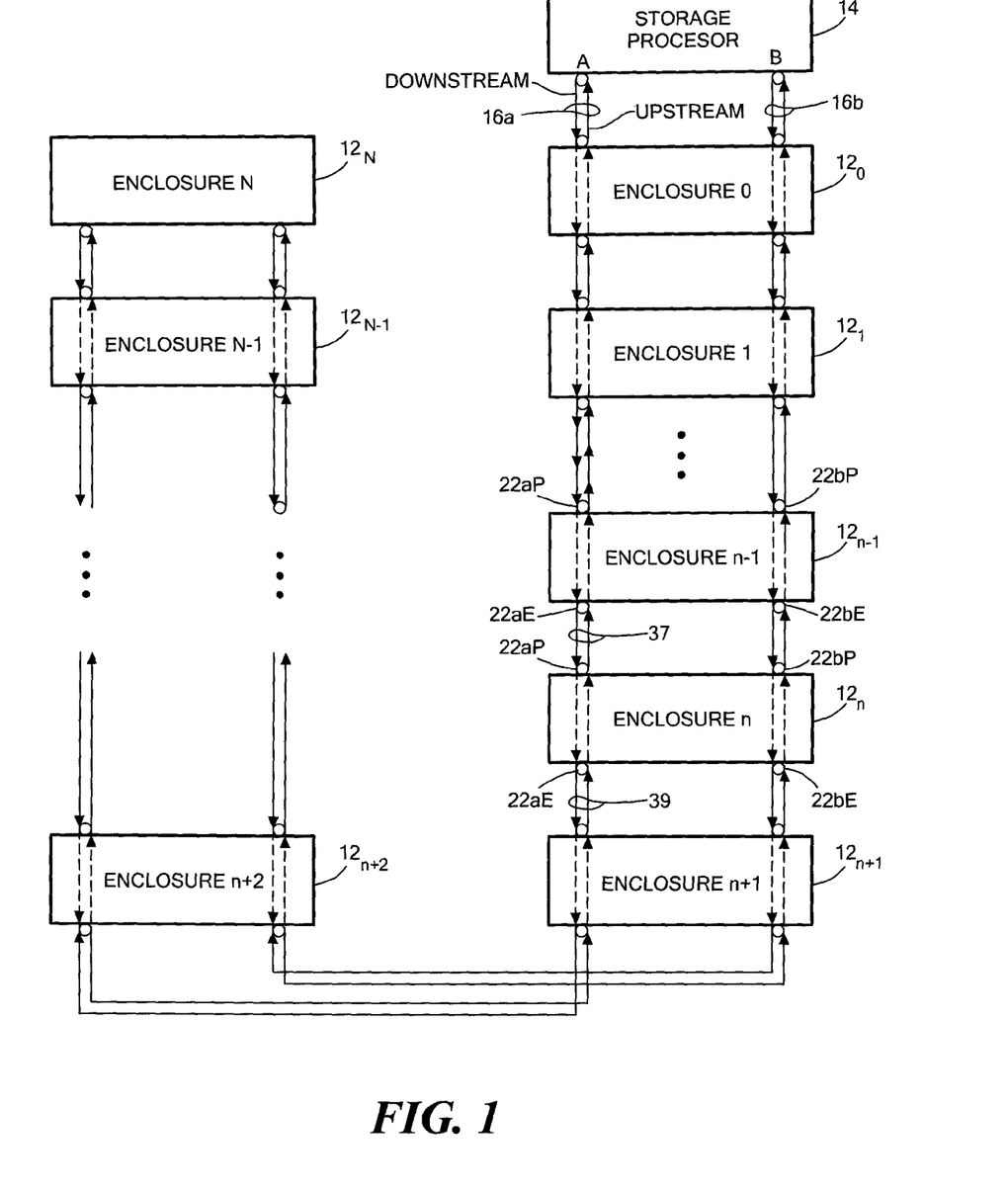
FIG. 1 is a block diagram of system having a plurality of enclosures serially interconnected to the storage processor through a fibre channel loop and programmed to automatically diagnosing faults therein in accordance with the invention.
Figure 2:
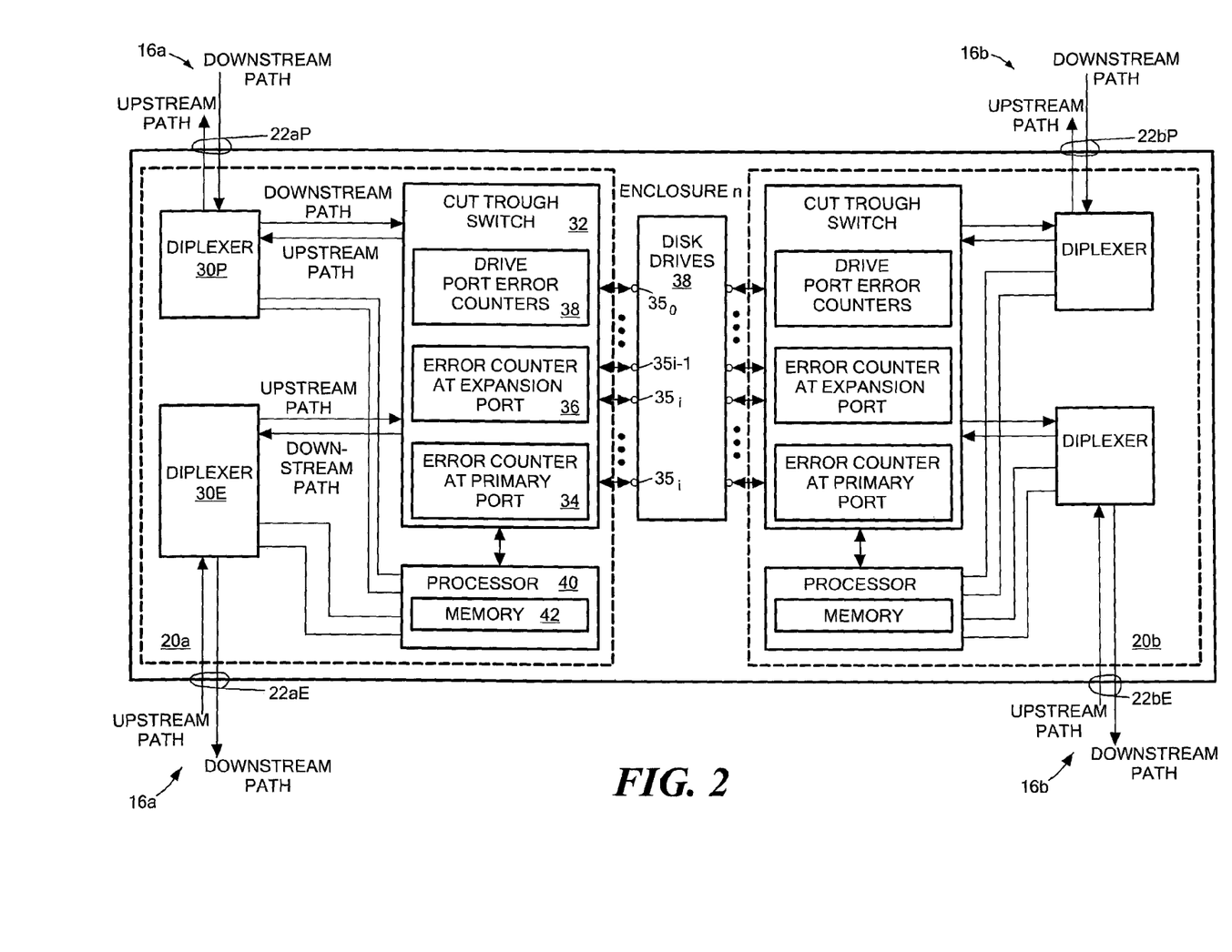
FIG. 2 is a diagram of an exemplary one of the enclosures of the system of FIG. 1.
Figure 3:
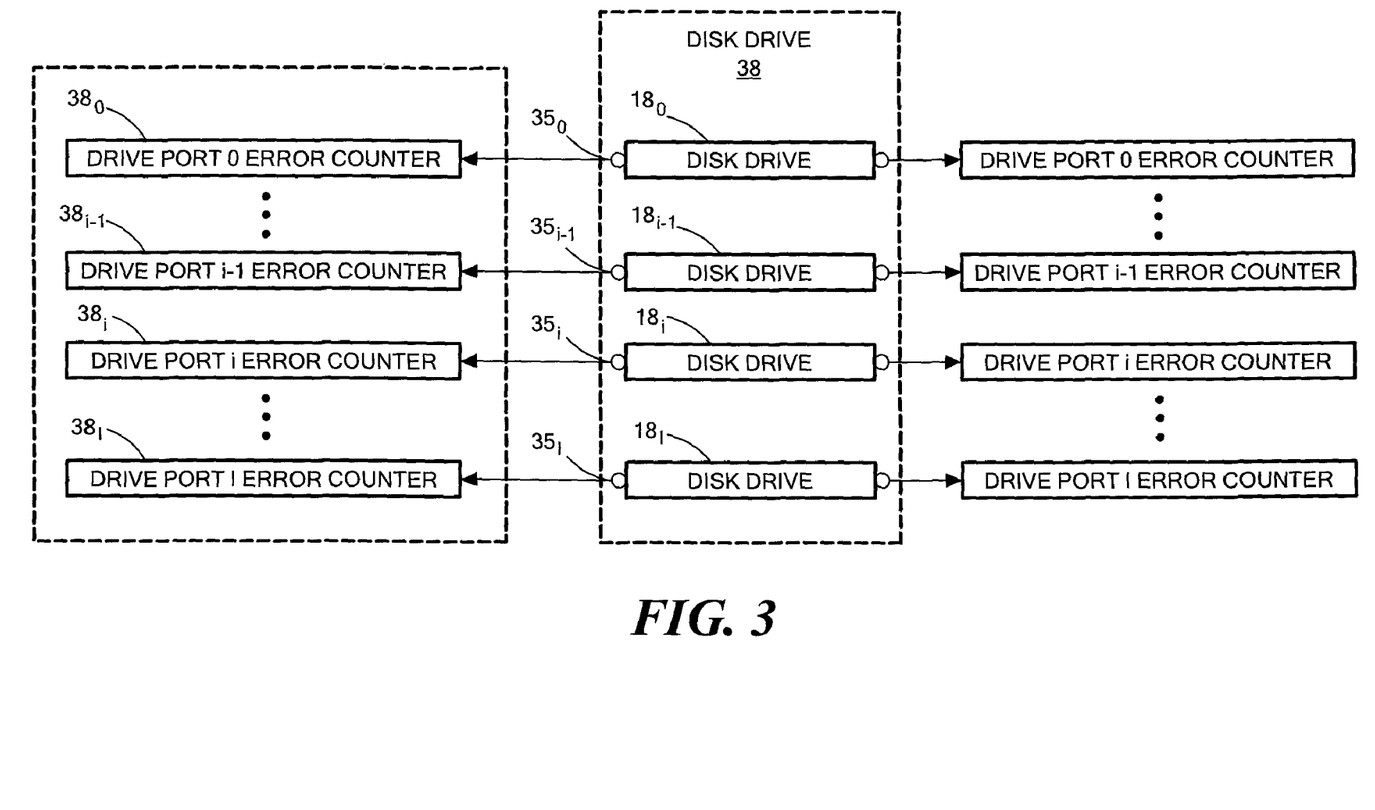
FIG. 3 is a diagram of a portion of the exemplary enclosure of FIG. 2, such portion showing disk drives the enclosures coupled to a plurality of disk drive port error counters in the enclosures.

Referring now to FIG. 1, a storage system includes a plurality of, here N+1, disk drive enclosures $12_0$-$12_N$ coupled to a pair of redundant ports, port A and port B of a data storage processor 14 through fibre channel loops 16a and 16b, respectively, as shown. As shown, each fibre channel loop 16a and 16b has a downstream path and an upstream path, as indicated In general, each of the enclosures $12_0$-$12_N$ is identical in construction, an exemplary one thereof, here enclosure $12_n$ is shown in FIG. 2 to include, as shown in FIG. 3, a plurality of, here I+1, dual ported disk drives $18_0$-$18_I$. Referring again to FIG. 2, each set of the dual ports $35_0$-$35_I$ is coupled to a corresponding one of a pair of link control cards (LCCs) 20a, 20b. Applications for the disk drives enclosures include, for example, JBOD (Just a Bunch Of Disks), RAID (Redundant Array of Independent Disks), and SAN (Storage Area Network).

One of the pair of LCCs, for example LCC 20a, is coupled in fibre channel loop 16a through a primary port 22aP and an expansion port 22aE while other one of the pair of LCCs, for example LCC 20b, is coupled in fibre channel loop 16b through a primary port 22bP and an expansion port 22bE to provided conventional fibre channel loops, see for example, U.S. Pat. No. 6,567,890 entitled "Fibre channel port by-pass selector section for dual ported disk drives", inventors Mulvey, et al., issued May 20, 2003, assigned to the same assignee as the present invention.

Referring again to FIG. 2 as well as to FIG. 1, and considering an exemplary one of the pair of LCC, here LCC 20a, such LCC 20a includes a pair of diplexers 30P and 30E coupled to the primary port 22aP and an expansion port 22aE, respectively, as shown. Each one of the diplexers 30P and 30E is here, for example, a diplexer such as that described in U.S. Pat. No. 5,901,151, entitled "System for orthogonal signal multiplexing", inventor Bleiweiss, et al., issued May 4, 1999, now assigned to the same assignee as the present inventions. The diplexers 30P and 30E are coupled to a cut through switch 32, here for example, that manufactured by PMC-Sierra, Burnaby, B. C., Canada. Such cut through switch includes: an error counter 34 for counting errors at the primary port 22aP; an error counter an error counter 36 for counting errors at the expansion port 22aE; and a set 38 of, here I+1, an disk drive error counters 38, here disk drive error counters $38_0$-$38_I$, shown in FIG. 3 for counting errors at the drive ports $35_0$-$35_I$, respectively of disk drives $18_0$-$18_I$, respectively as shown.

A processor 40 (FIG. 2) having a memory 42 for storing a program to be described in connection with FIGS. 4A-4C, 5A-5D, and 6 is connected to the cut through switch 32, included in the LCC 20a, as shown.

As will be described below, the processor 40 sequentially reads the disk drive port error counters 38, the primary port error counter 34 and the expansion port error counter 36 in each one of the enclosures $12_0$-$12_N$ to determine whether errors counted in any one of such counters exceeds a predetermined threshold over a predetermined period of time. Also processor 40 processing the counters 34, 36 and 38 to isolate faults in either one of the expansion ports 22aE, one of the primary ports 22aP, one of the disk drive ports $35_0$-$35_I$, or a cable 35, 37 of the fibre channel loop connecting a pair of the enclosures $12_0$-$12_N$.

Figure 4A:
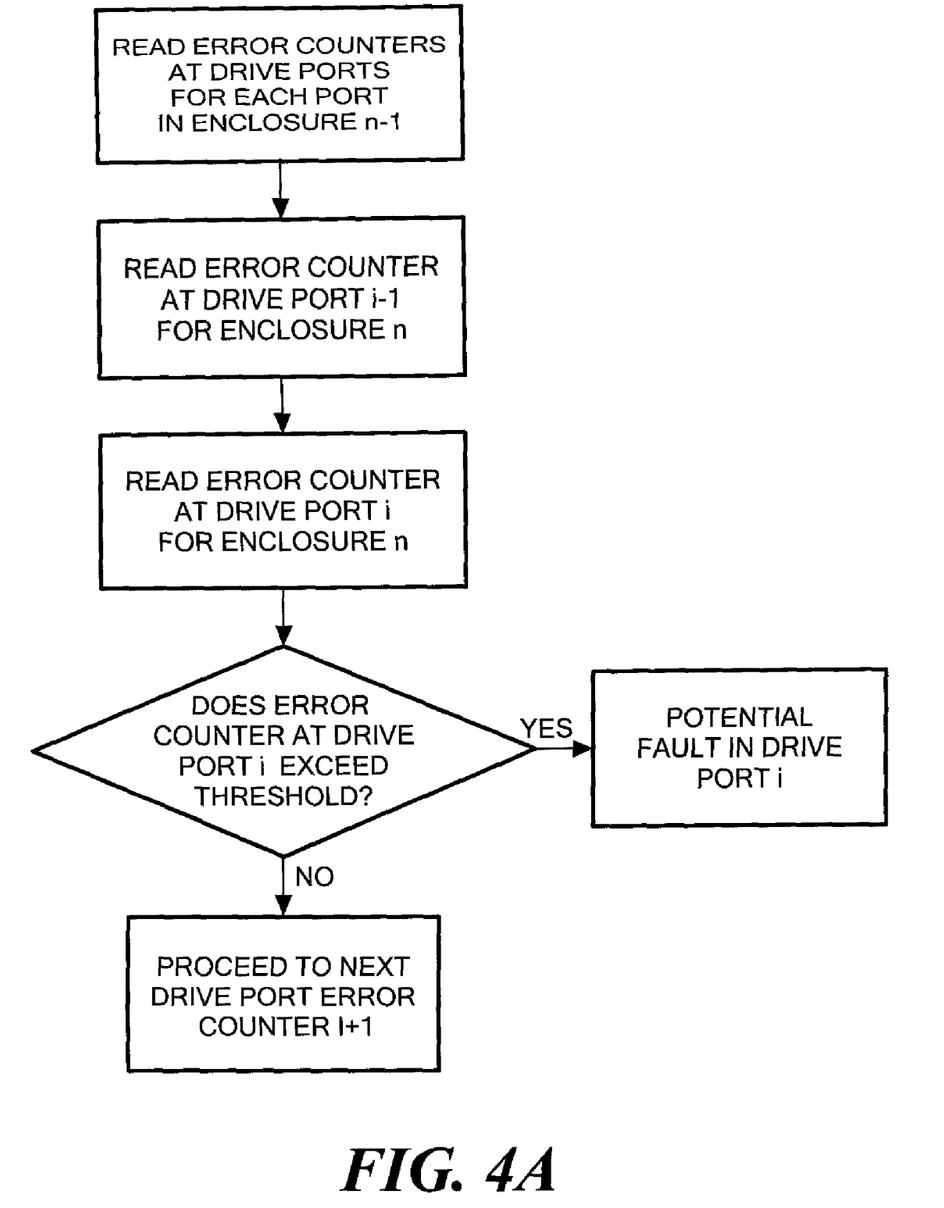
FIGS. 4A, 4B and 4C are flowcharts of a method used to detect potential sources of faults in the system of FIG. 1 at a point in time in accordance with the invention.

Referring to FIG. 4A, the process for determining errors in disk drive ports of an exemplary one of the enclosures $12_0$-$12_N$, here for example enclosure $12_n$, at a point in time, is shown. The process begins by reading the error counters at the drive ports for each of the drive ports in enclosure $20_{n-1}$. Next, the process reads the error counter at drive port i–1 for enclosure $20_n$; Next, the process reads the error counter at drive port i for enclosure $12_n$; Next the process determines whether the error counter at drive port i exceeds a predetermined threshold. If the predetermined threshold is exceeded, a potential fault is noted in drive port i; otherwise, if the predetermined threshold is not exceeded, the process proceeds as described above for the next successive disk drive port error counter i+1

Figure 4B:
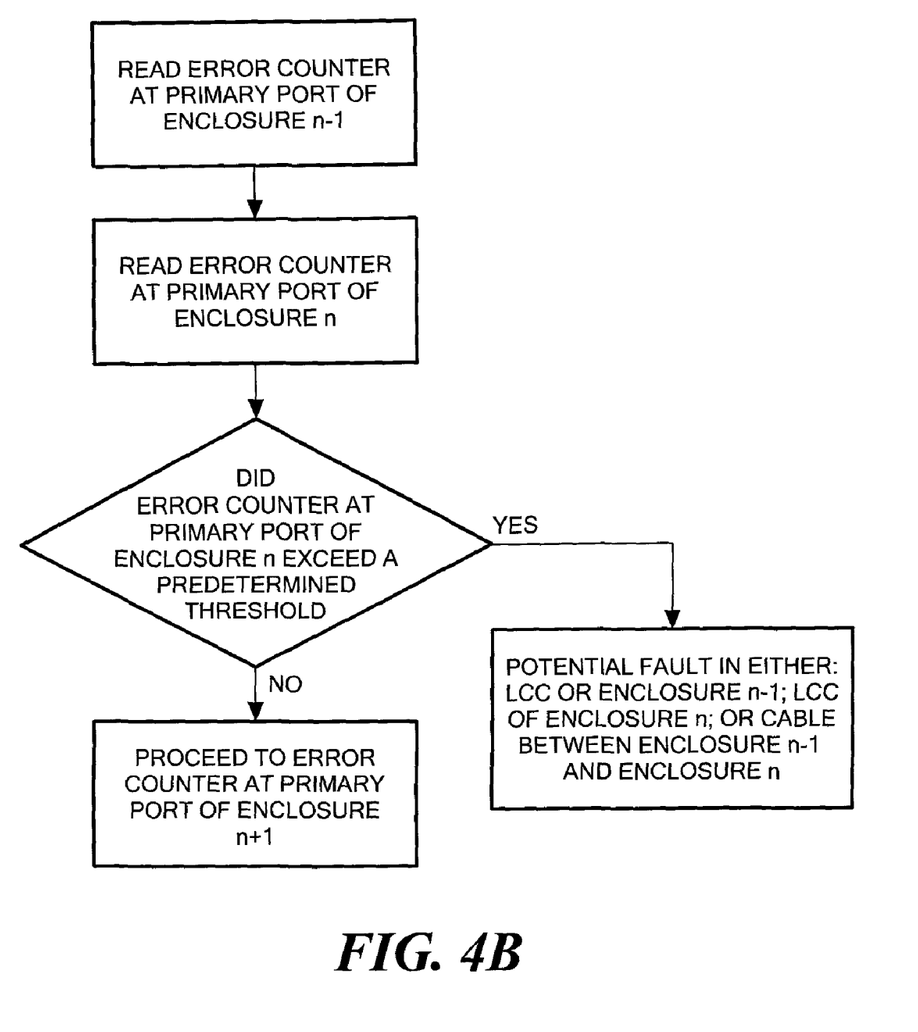

Referring now to FIG. 4B, the process for determining errors at the primary port 22aP of an exemplary one of the enclosures $12_0$-$12_N$, here for example enclosure $12_n$, at a point in time, is shown. First, the process reads the error counter 34 (FIG. 2) at the primary port 22aP of enclosure $12_{n-1}$. Next, the process reads the error counter 34 at primary port 22aP of enclosure $12_n$. Next, the process determines whether the error counter 34 at the primary port 22aP of enclosure $12_n$ exceeds a predetermined threshold. If the predetermined threshold was exceeded, the process identifies a potential fault at either: The LCC of enclosure $12_{n-1}$; the LCC of enclosure $12_n$; or the pair of cables 37 (FIG. 1) in the downstream path and upstream path between enclosure $12_{n-1}$ and enclosure $12_n$; otherwise, if the predetermined threshold was not exceeded, the process proceeds to the error counter 34 at primary port 22aP of the next downstream enclosure, enclosure $12_{n+1}$.

Figure 4C:
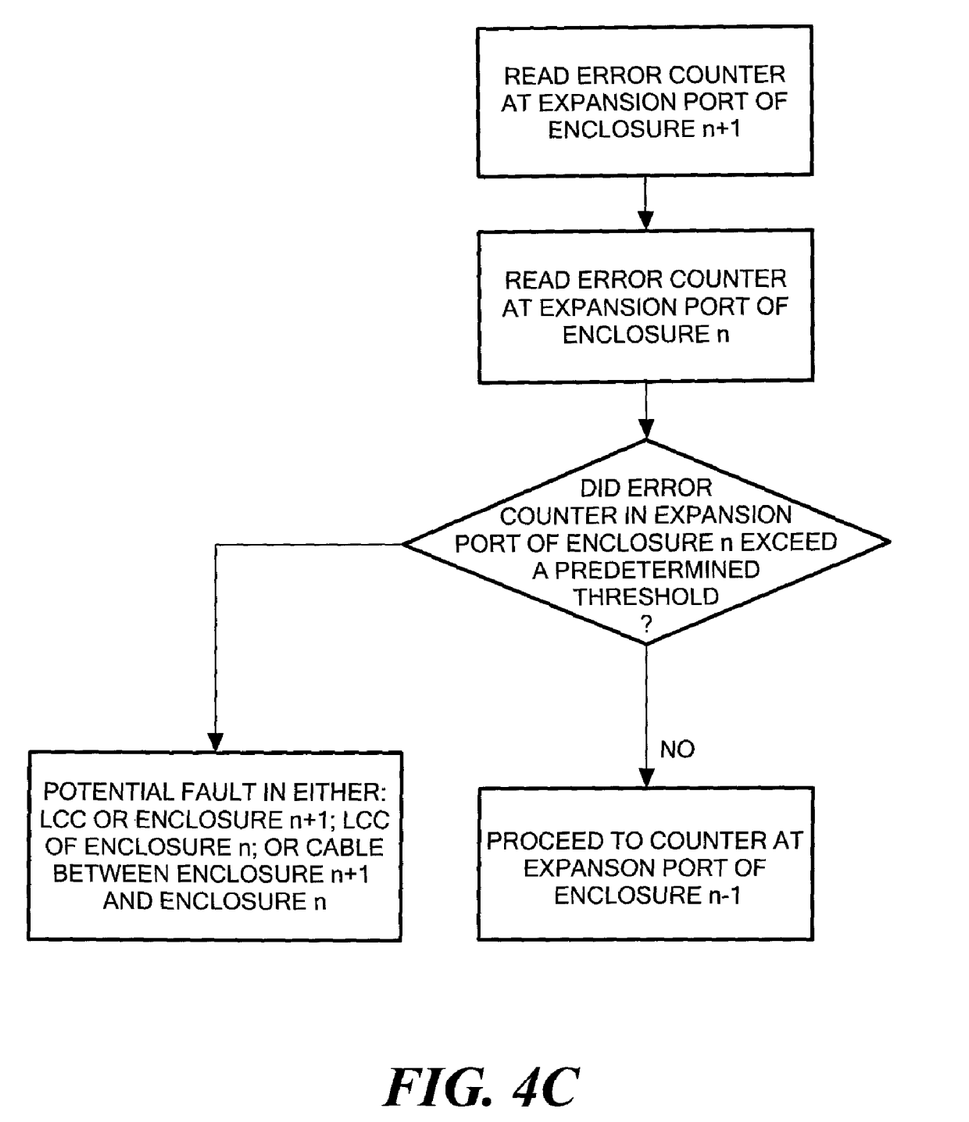

Referring now to FIG. 4C, the process for determining errors at the expansion port 22aE of an exemplary one of the enclosures $12_0$-$12_N$, here for example enclosure $12_n$, at a point in time is shown. First, the process reads the error counter 36 at the expansion port 22aE at enclosure $12_{n+1}$. Next, the process reads the error counter 36 at the expansion port 22aE of enclosure $12_n$. Next, the process determines whether the error counter 36 at the expansion port 22aE of enclosure $12_n$ exceeded a predetermined threshold. If the predetermined threshold was exceeded, the process identifies a potential fault in either: the LCC of enclosure $12_{n+1}$; the LCC of enclosure $12_n$; or the pair of cables 39 (FIG. 1) in the downstream path and upstream path between enclosure $12_{n+1}$ and enclosure $12_n$. On the other hand, if the predetermined threshold was not exceeded, the process proceeds to the counter 36 at the expansion port 22aE of the next succeeding downstream enclosure $12_{n-1}$.

Figure 5A:
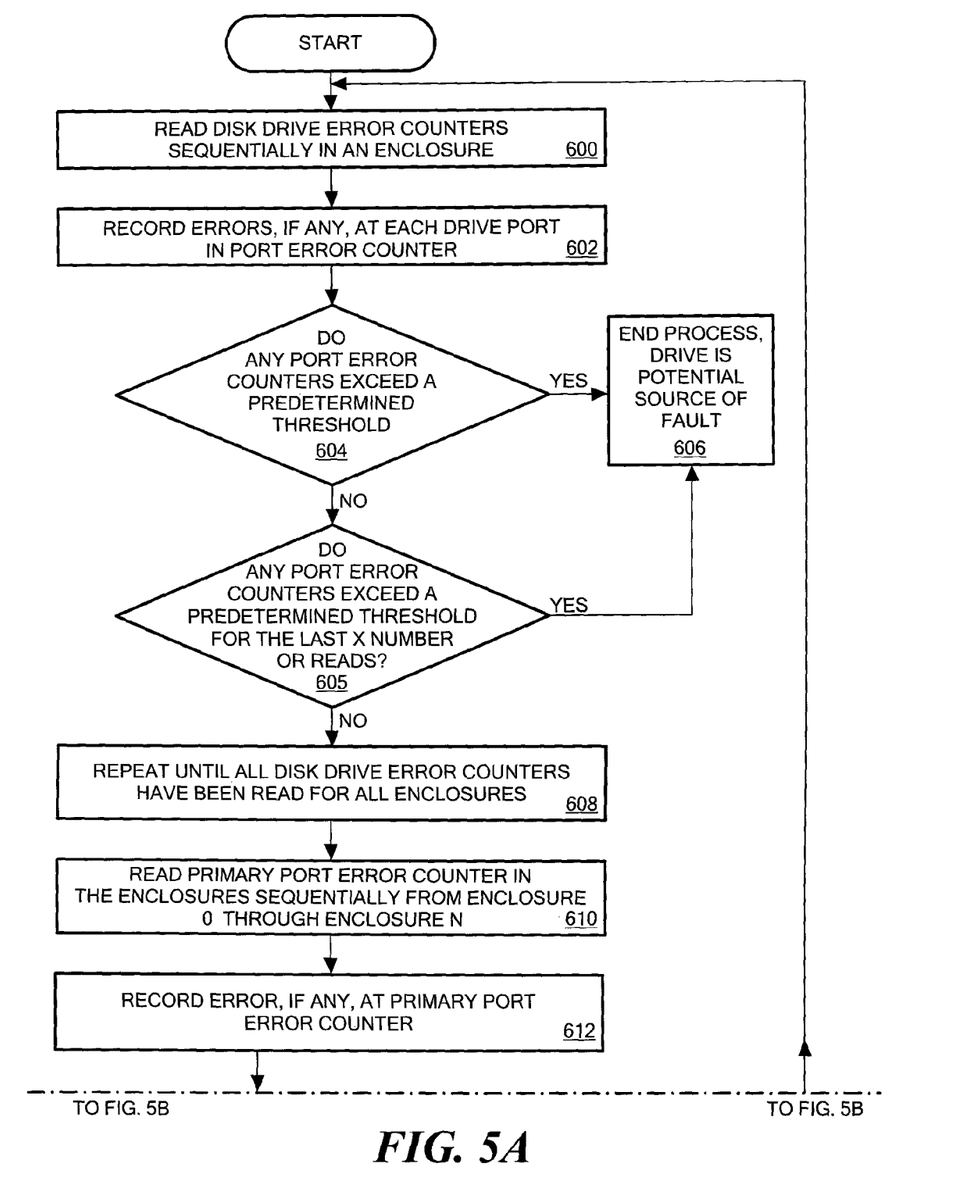
FIG. 5 is a flowchart of a method used to detect potential sources of faults in the system of FIG. 1 over a predetermined period of time in accordance with the invention.
Figure 5B:
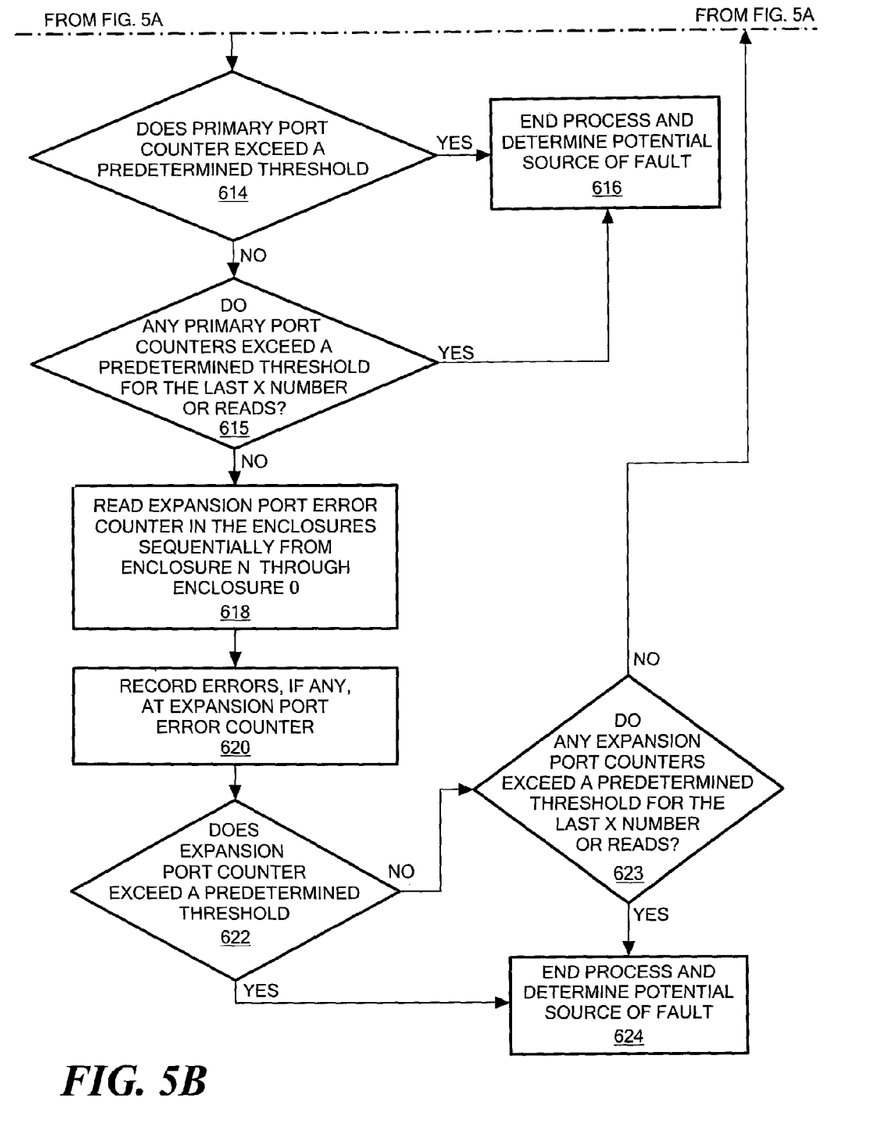

Referring now to FIG. 5, a process for automatically diagnosing errors in the enclosures or in the cables interconnecting the enclosure over time is shown. The process begins by reading the disk drive error counters $38_0$-$38_I$ sequentially in an enclosure, Step 600. The process records errors, if any, at each drive port $35_0$-$35_I$ in the corresponding disk drive port error counter $38_0$-$30_I$, respectively, Step 602. The process determines whether any of the port counters $38_o$-$30_I$ has a count exceeding a predetermined threshold as described above in connection with FIG. 4A, Step 604. If the any of the port counters $38_0$-$30_I$ has a count exceeding a predetermined threshold, the process ends and a potential fault is identified as described above in connection with FIG. 4A, Step 606. On the other hand, if none of the port counters $38_0$-$30_I$ has a count exceeding the predetermined threshold, the process determines whether any of the port error counters exceeds a predetermined threshold for the last X number of reads of such counters, where X is a predetermined number, for example 3, repeats Steps 602-604 for the remaining enclosures, Step 608.

Next, the process reads the primary port 22aP error counter 34 sequentially for all enclosures $12_0$-$12_N$, as described above in connection with FIG. 4B, Step 610. The process records errors, if any, in the primary port counters 34, Step 612. The process determines whether any primary port counter 34 exceeds a predetermined threshold, as described above in connection with FIG. 4B, Step 614. If any primary port counter 34 exceeded the predetermined threshold, the process ends and a potential fault is detected as described above in connection with FIG. 4B, Step 616. On the other hand, if none of the primary port counters 34 exceeded the predetermined threshold.

Next the process determines whether any of the primary port counters exceeds a predetermined threshold for the last X number of reads of such counters, where X is a predetermined number, for example 3, Step 615. If any of the primary port error counters exceeds a predetermined threshold for the last X number of reads of such counters, the process ends and a potential fault is identified as described above in connection with FIG. 4A, Step 616. On the other hand, if none of the primary port error counters exceeds the predetermined threshold for the last X number of reads of such counters the process reads the expansion port counters 36 in the enclosures sequentially as described above in connection with FIG. 4C, Step 618. The process records errors, if any in the expansion port counters 36, Step 620.

Next, the process determines whether one of the expansion port counters 36 exceeded a predetermined threshold, Step 622. If one of the expansion port counters 36 exceeded a predetermined threshold, the process ends and a potential fault is identified as described above in connection with FIG. 4C, Step 624. On the other hand, if none of the expansion port counters 36 exceeded the predetermined threshold, the process determines whether any of the expansion error counters exceeds a predetermined threshold for the last X number of reads of such counters, where X is a predetermined number, for example 3, Step 623. If any of the primary port error counters exceeds a predetermined threshold for the last X number of reads of such counters, the process ends and a potential fault is identified as described above in connection with FIG. 4A, Step 624. On the other hand, if none of the expansion port error counters exceeds the predetermined threshold for the last X number of reads of such counters the process returns to Step 600/

A number of embodiments of the invention have been described. Nevertheless, it will be understood that various modifications may be made without departing from the spirit and scope of the invention. Accordingly, other embodiments are within the scope of the following claims.

What is claimed is:

1. A method for automatically diagnosing faults in hardware components used in a data storage system, such system having a plurality of enclosures, each one of such enclosures having: a primary port; an expansion port; a plurality of disk drives; and a link control card coupled to the primary port and to the expansion port; and the plurality of disk drives, such link control card having a cut through switch, such cut through switch having: disk drive port error counters for counting at ports of the plurality of disk drives; a primary port error counter for counting cumulative errors at the primary port, and an expansion port error counter for counting cumulative errors at the expansion port; and wherein the primary ports and expansion ports are serially interconnected to the storage processor through a fibre channel loop, such method comprising:

sequentially reading the disk drive port error counters, the primary port error counter and the expansion port error counter in each one of the enclosures to determine whether errors counted in any one of such counters exceeds a predetermined threshold over a predetermined period of time.

2. The method recited in claim 1 including processing the counters to isolate faults in either one of the expansion ports, one of the primary ports, one of the disk drive ports, or a cable of the fibre channel loop connecting a pair of the enclosures.

\* \* \* \* \*